No. 745,870. PATENTED DEC. 1, 1903.
L. P. LOWE.
APPARATUS FOR SEPARATING AND COLLECTING CONDENSABLE CARBONACEOUS SUBSTANCES.
APPLICATION FILED MAR. 10, 1902.
NO MODEL.
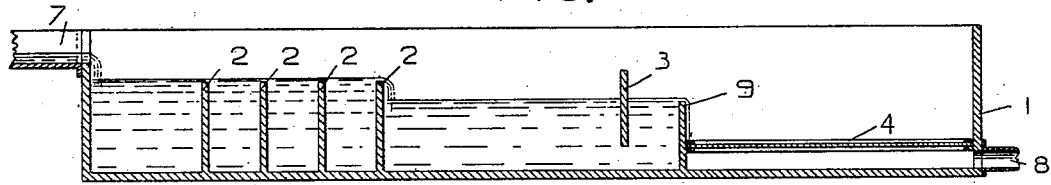
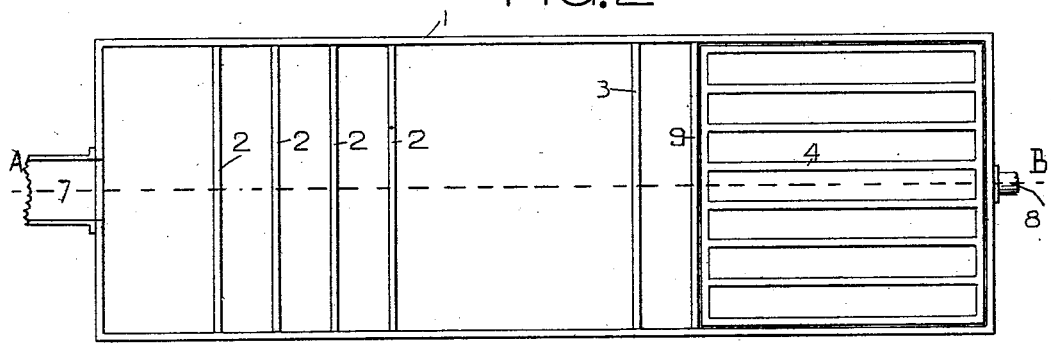
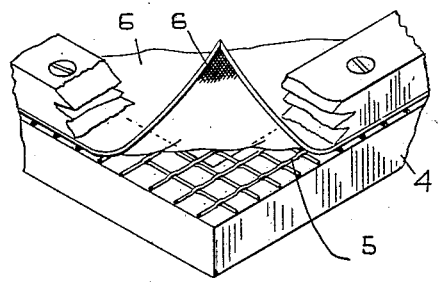
WITNESSES:
E. W. Horne
S. McLaughlin
INVENTOR
L. P. Lowe No. 745,870. Patented December 1, 1903.

UNITED STATES PATENT OFFICE.

LEON P. LOWE, OF SAN FRANCISCO, CALIFORNIA.

APPARATUS FOR SEPARATING AND COLLECTING CONDENSABLE CARBONACEOUS SUBSTANCES.

SPECIFICATION forming part of Letters Patent No. 745,870, dated December 1, 1903.

Application filed March 10, 1902. Serial No. 97,594. (No model.)

*To all whom it may concern:*

Be it known that I, LEON P. LOWE, a citizen of the United States, residing at San Francisco, State of California, have invented a new and useful improvement in an apparatus for separating and collecting condensable hydrocarbons and solid carbonaceous substances derived from the washing and scrubbing of manufactured gases, which improvement is fully set forth in the following specification and accompanying drawings.

My invention embodies novel features, as will be hereinafter set forth and definitely claimed.

In the ordinary manufacture of commercial gases, especially when made or partially made from the decomposition of petroleum-oils, condensable hydrocarbons and solid carbonaceous by-products are formed, usually in the shape of tars and lampblack, and as these substances are valuable for many purposes their recovery is advisable. If lampblack and tar are made in the same operation, they are separated with considerable difficulty.

Referring to the drawings, Figure 1 is a sectional elevation of what I term a "tar and lampblack separator" on line A B of Fig. 2. Fig. 2 is a plan of same. Fig. 3 is a perspective view of the corner of a tray, showing a wire screen surmounted by a screen of finer mesh, preferably in the form of a fabric, such as burlap.

Similar numerals of reference indicate corresponding parts in the various figures.

1 is a box preferably of rectangular form and fitted with various compartments and trays, as shown.

2 2 2 2 are partitions extending across box 1 upward from the bottom thereof and are so spaced as to form divisions, as shown. These partitions may be of any number desired.

3 is a partition extending across box 1 and so placed as to allow a space between the bottom of box 1 and partition 3.

4 is a tray, or sets of trays, preferably made of slats fitted with screens.

5 is a screen, preferably of wire-cloth, surmounting tray 4.

6 is a screen, preferably in the form of a fabric, such as burlap, surmounting screen 5.

7 is an inlet connection at top of box 1, placed in any convenient location.

8 is an outlet connection from bottom of box 1, placed in any convenient location.

9 is a partition similar to partitions 2, save that its upper edge is lower than those of partitions 2.

The operation of this separator is as follows: The waste water coming from the gas-making apparatus and which carries the substances described above enters the separator 1 through inlet 7, the heavy tarry portions contained in the water falling to the bottom of the pits formed by the partitions 2 2 2 2, while the lighter portion, such as lampblack, is carried on the surface of the water and flows over the tops of the partitions 2, falling into a lower pit formed by partition 9, wherein it is retained by the baffle-partition 3, although the water from which it has been separated is allowed to escape by passing beneath partition 3 and over the surface of partition 9.

In practice it is found that certain portions of the lampblack and tarry substances are of about the same weight as water, and consequently do not either settle or float, but are carried along and would ordinarily escape unless additional means were provided to collect same, and this I accomplish by allowing the water which flows over partition 9 to fall upon the screens 4, which check and collect same, while the water passes through and escapes through the opening 8 in a practically clear and clean condition.

If it is not desired to fully recover all of the substances coming to the separator, the screens 4 can be dispensed with and the operation of the separator be thus simplified.

The separator described can be of any convenient form and construction to meet any requirement, and I do not confine myself to any particular design, but in ordinary operation I prefer the plan and arrangement as shown.

Having thus described my invention, I claim—

1. In an apparatus of the character described, the combination of the separator-box having a series of partitions extending upward from the bottom of the box and dividing the same into a succession of compartments, a partition extending upward to a lower level than the first partition, a wall in front of said latter partition, spaced from the bottom of the box to permit the waste water to pass below said wall, a screen at a lower level than the top of the lowest partition and filtering material placed on said screen through which the water is compelled to pass, and means for drawing off the water passing through said filter, substantially as described.

2. A separator for waste water in gas-making comprising three compartments in which the water is compelled to travel in succession, the first compartment having partitions over which the water is compelled to pass, to catch the heavy tarry substance, a second compartment having a baffle plate or partition spaced from the bottom thereof to catch the particles lighter than water, and the third compartment having a filter, a screen through which the water is compelled to pass thereby catching particles of substantially the same specific gravity as water, substantially as described.

In witness whereof I have hereunto set my hand in the presence of two subscribing witnesses.

L. P. LOWE.

Witnesses:
ERNEST W. HEINE,
S. MCLAUGHLIN.